US006277304B1

(12) United States Patent
Wei et al.

(10) Patent No.: US 6,277,304 B1
(45) Date of Patent: Aug. 21, 2001

(54) PROCESS FOR PRODUCING ELECTROACTIVE INORGANIC ORGANIC HYBRID MATERIALS

(75) Inventors: Yen Wei, Plainsboro, NJ (US); Jui-Ming Yeh; Wei Wang, both of Philadelphia, PA (US); Guang-Way Jang, East Brunswick, NJ (US)

(73) Assignee: Drexel University, Philadelphia, PA (US)

( * ) Notice: Subject to any disclaimer, the term of this patent is extended or adjusted under 35 U.S.C. 154(b) by 0 days.

(21) Appl. No.: 09/575,438

(22) Filed: May 22, 2000

Related U.S. Application Data

(62) Division of application No. 09/173,840, filed on Oct. 16, 1998, now Pat. No. 6,066,269, which is a division of application No. 08/701,570, filed on Aug. 22, 1996, now Pat. No. 5,868,966, which is a continuation of application No. 08/414,660, filed on Mar. 30, 1995, now abandoned.

(51) Int. Cl.$^7$ ............................. H01B 1/04; H01B 1/06; C08K 3/34

(52) U.S. Cl. ........................................ 252/500; 524/261

(58) Field of Search .............................. 252/500, 315.01, 252/315.2; 524/261

(56) References Cited

U.S. PATENT DOCUMENTS

| | | | |
|---|---|---|---|
| 4,698,319 | 10/1987 | Ray ........................................ | 501/87 |
| 4,734,343 | 3/1988 | Berthier et al. ....................... | 429/192 |
| 4,780,246 | 10/1988 | Naarman .............................. | 252/500 |
| 4,940,517 | 7/1990 | Wei . | |
| 4,986,886 | 1/1991 | Wei et al. . | |
| 5,032,547 | 7/1991 | Giannelis et al. ........................ | 501/3 |
| 5,120,807 | 6/1992 | Wei et al. . | |
| 5,168,024 | 12/1992 | Yamamoto .............................. | 430/58 |
| 5,316,695 | 5/1994 | Wilkes et al. ....................... | 252/315.6 |
| 5,340,500 | 8/1994 | Chao et al. ........................... | 252/500 |

OTHER PUBLICATIONS

Yen Wei et al., "Synthesis, Characterization, and Properties of New Polystyrene–SiO$_2$ Hybrid Sol Gel Materials," *J. Mater. Res.*, 8–5:1143–1152 (1993).

Yen Wei et al., "Synthesis of Water–Soluble Polyacrylics Modified Silica Sol–Gel Materials", *Chem. Mater.*, 6–10:1737–1741 (1994).

Harreld et al., "Design and Synthesis of Varadium Pentoxide/Polypyrrole", Mater Res. Soc. Symp. Proc., 519, 191–200 1998 (Abstract only).

E. Pope et al., "Transparent Silica Gel—PMMA Composites," *J. Mater. Res.*, vol. 4, No. 4 (Jul./Aug. 1989), pp. 1018–1026.

G. Wilkes et al., "New Inorganic—Organic Hybrid Materials Through the Sol–Gel Approach," from *Silicon–Based Polymer Science: A Comprehensive Resource*, (1990) pp. 207–225.

Yen Wei et al., "Polymerization of Aniline and Alkyl Ring–Substituted Anilines in the Presence of Aromatic Additives," *J. Phys. Chem.*, 94 (1990) pp. 7716–7721.

M. Ellsworth and B. Novak, "Mutually Interpenetrating Inorganic–Organic Networks. New Routes into Nonshrinking Sol–Gel Composite Materials," *J. Am. Chem. Soc.*, vol. 113, No. 7 (1991), pp. 2756–2758.

J. Mark et al., "Simultaneous Curing and Filling of Elastomers," *Macromolecules*, vol. 17 (1984) pp. 2613–2616.

H. Huang et al., "Structure—Property Behavior of New Hybrid Materials Incorporating Oligomeric Species into Sol–Gel Glasses. 3. Effect of Acid Content, Tetraethoxysilane Content, and Molecular Weight of Poly(dimethylsiloxane)," *Macromolecules*, vol. 20 (1987) pp. 1322–1330.

Y. Chujo et al., "A Novel Silane Coupling Agent. 1. Synthesis of Trimethoxysilyl–Terminated Poly(N–acetylethylenimine)," *Macromolecules*, vol. 22 (1989) pp. 2040–2043.

B. Wang et al., "New High Refractive Index Organic/Inorganic Hybrid Materials from Sol–Gel Processing," *Macromolecules*, vol. 24 (1991) pp. 3449–3450.

G. Wilkes et al., "'Ceramers': Hybrid Materials Incorporating Polymeric/Oligomeric Species Into Inorganic Glasses Utilizing a Sol–Gel Approach," *Polymer Preprints*, vol. 26 (1985) p. 300–301.

H. Huang and G. Wilkes, "Structure–Property Behavior of a TEOS–Poly(Tetramethylene Oxide) Hybrid System Prepared by the Sol–Gel Process 1. Effect of PTMO Molecular Weight," *Polymer Preprints*, vol. 28(2) (1987) pp. 244–245.

Y. Chujo et al., "Block Copolymer of 2–Methyl–2–Oxazoline with Silica Gel. An Organic–Inorganic Hybrid Polymer," *Polymer Preprints*, vol 31, No. 1 (1990) pp. 59–60.

(List continued on next page.)

Primary Examiner—Mark Kopec
(74) Attorney, Agent, or Firm—Akin, Gump, Strauss, Hauer & Feld, L.L.P.

(57) ABSTRACT

Hybrid materials are formed having a homogeneous distribution of a conductive organic polymer or copolymer in an inorganic matrix. The conductive organic polymer may be electronically conductive, e.g., polyaniline, or may be ionically conductive, e.g., sulfonated polystyrene. The inorganic matrix is formed as a result of sol-gel chemistry, e.g., by the hydrolysis and condensation of tetraethyl orthosilicate and trialkoxysilyl groups in the organic polymers. A homogeneous distribution of organic polymer in the inorganic matrix is achieved by preparing separate solutions of organic polymer and sol-gel monomer, and then combining those solutions with a catalyst and stirring, to form a homogeneous clear solution. Upon evaporation of the solvent and other volatiles, a monolithic hybrid material may be formed. The combination of conductive organic polymer in an inorganic matrix provides desirable adhesion properties to an inorganic substrate while maintaining the conductivity of the organic polymer.

1 Claim, No Drawings

OTHER PUBLICATIONS

C. Landry and B. Coltrain, "Organic–Inorganic Composites Prepared Via the Sol–Gel Method: Some Insights Into Morphology Control and Physical Properties," *Polymer Preprints,* vol. 32, No. 3 (1991) pp. 514–515.

A. Morikawa et al., "Preparation of a New Class of Polyimide—Silica Hybrid Films by Sol —Gel Process," *Polymer Journal,* vol. 24, No. 1, (1992) pp. 107–113.

Yen Wei et al., "An Open–Circuit–Potential Study of the Chemical Plymerization of Aniline and Effect of Additives," *Polymer Preprints,* vol. 35(1) (1994) pp. 242–243.

J. Mark et al., "Electron Microscopy of Elastomers Containing In–Situ Precipitated Silica," *Polymer,* vol. 26 (1985) p. 2069.

Yen Wei et al., "A Study of the Mechanism of Aniline Polymerization," *Journal of Polymer Science: Part A: Polymer Chemistry,* vol. 27. (1989) pp. 2385–2396.

Yen Wei et al., "A New Method for Preparation of Electrically Conductive Polythiophenes," *Journal of Polymer Science: Part C: Polymer Letters,* vol. 28 (1990) pp. 219–225.

M.S. Metwally et al., "Synthesis Of A New Sulphonated Cation Exchange Resin And Its Application In Catalysed Hydrolysis Of Esters," *Journal of Materials Science,* vol. 25 (1990) pp. 4223–4225.

P. Calvert, "Vegetable and mineral," *Nature,* vol. 353 (Oct. 10, 1991) pp. 501–502.

Y. Haruvy and S. Webber, "Supported Sol–Gel Thin–Film Glasses Embodying Laser Dyes. 1. A New Fast Method for the Preparation of Optically Clear Polysiloxane Thin–Film Glasses," *Chem. Mater.,* vol. 3, No. 3 (1991) pp. 501–507.

K. Rajamani et al., "Kinetics of the Hydrolysis of Ethyl Acetate Catalysed by Cation–exchange Resin," *J. Appl. Chem. Biotechnol.,* vol. 28 (1978) pp. 699–707.

M. Nandi et al., "Molecular Level Ceramic/Polymer Composites. 2. Synthesis of Polymer–Trapped Silica and Titania Nanoclusters," *A. Chem. Mater.,* vol. 3, (1990) pp. 201–206.

B. Novak, "Hybrid Nanocomposite Materials—Between Inorganic Glasses and Organic Polymers," *Adv. Mater,* vol. 5, pp. 422–433. No pub date.-

PROCESS FOR PRODUCING ELECTROACTIVE INORGANIC ORGANIC HYBRID MATERIALS

CROSS REFERENCE TO RELATED APPLICATION

This application is a division of U.S. application Ser. No. 09/173,840, filed Oct. 16, 1998, now U.S. Pat. No. 6,066,269, which is a division of U.S. application Ser. No. 08/701,570, filed Aug. 22, 1996, now issued U.S. Pat. No. 5,868,966, which is a continuation of U.S. application Ser. No. 08/414,660, filed Mar. 30, 1995, abandoned, entitled "Electroactive Inorganic Organic Hybrid Materials" The entire disclosures of applications Ser. Nos. 08/414,660, 08/701,570 and 09/173,840 as filed are incorporated herein by reference.

FIELD OF THE INVENTION

The invention is directed to hybrid materials comprising organic polymers and an inorganic matrix, and more particularly to organic polymers that are homogeneously distributed throughout, and in covalent bonding with, an inorganic matrix, and methodology for preparing same.

BACKGROUND OF THE INVENTION

As recognized today, organic compounds are the compounds formed primarily of carbon, hydrogen and oxygen, although other atoms such as nitrogen, sulfur and phosphorus may also be present. Inorganic chemistry essentially embraces all the compounds that are not organic compounds. In the natural world, organic compounds are found predominately in animal and vegetable matter, while minerals contain predominantly inorganic compounds. Over 90% of the earth's crust is composed of minerals, with silicate minerals, i.e., minerals having silicon-oxygen bonds, being by far the most prevalent.

While the natural world, and the historical development of chemistry, has tended to separate inorganic and organic compounds, modern researchers have become increasingly interested in preparing organic inorganic hybrid materials. As used herein, the term organic inorganic hybrid materials embraces two types of hybrids. In the first, covalent bonding occurs between an organic polymer and an inorganic matrix, and such hybrids will be referred to as covalent hybrids. An oxygen atom, which is commonly found in both organic polymers and inorganic matrices, is typically employed to link the organic and inorganic components of a covalent hybrid. In a second type of hybrid, the organic polymer and inorganic matrix are intimately mixed together, i.e., the organic polymer is uniformly dispersed throughout an inorganic matrix, or vice versa, this second type of hybrid, which does not contain a covalent sond between organic and inorganic components, will be referred to as dispersion hybrids. Covalent and dispersion hybrids are to be distinguished from conventional composite materials formed from organic and inorganic materials, where conventional composite materials have macroscopic interfaces.

The development of sol-gel chemistry, which occurred during the past two decades, has provided a convenient entry to the inorganic matrices of hybrid materials according to the invention. For leading references to sol-gel chemistry, which was initially developed for the preparation of ceramics, see, e.g., C. J. Brinker et al. *Sol-Gel Science, The Physics and Chemistry of Sol-Gel Processing*, Academic Press, San Diego (1990); D. R. Ulrich *J. Non-Cryst. Solids* (1990) 121:419; G. L. Wilkes et al., *Silicon-Based Polymer Science, Advances in Chemistry Series* 224, J. M. Ziegler and F. W. Fearon, Eds. Am. Chem. Soc., Washington, D.C. (1990), pp. 207–226; R. Dagani, *Chemical & Engineering News* (1991) 69–21:30; P. Calvert, *Nature* (1991) 353:501; and B. M. Novak, Adv. Mater. (1993) 5:422.

A number of organic polymers have been incorporated into $SiO_2$ and/or $TiO_2$ matrices. See, e.g., G. L. Wilkes et al., *Polym. Prepr. (Am. Chem. Soc., Div. Polym. Chem.)* (1985) 26:300; H. Huang et al., *Macromolecules* (1987) 20:1322; J. E. Mark et al., *Macromolecules* (1984) 17:2613; J. E. Mark et al., *Polymer* (1985) 26:2069; S. B. Wang et al., *Macromol. Reports* (1991) A28:185; and Y. Haruvy et al., *Chem. Mater.* (1991) 3:501, using polydimethylsiloxane; H. Huang et al., *Polym. Prepr. (Am. Chem. Soc., Div. Polym. Chem.)* (1985) 28:244, using poly(tetramethylene oxide); Nandi, et al., *A. Chem. Mater.* (1991) 3:201), using polyimides; B. Wang et al., *Macromolecules* (1991) 24:3449; and A. Morikawa et al., *Polym. J.* (1992) 24:107), using poly(arylene ether ketone) and poly(arylene ether sulfone); E. J. A. Pope et al., *J. Mater. Res.* (1989) 4:1018; C. J. T. Landry et al., *Polym. Prepr. (Am. Chem. Soc., Div. Polym. Chem.)* (1991) 32:514; and N. W. Ellsworth et al., *J. Am. Chem. Soc.* (1991) 113:2756, using polymethacrylates; Y. Chujo et al., *Macromolecules* (1989) 22:2040; Y. Chujo et al., *Polym. Prepr. (Am. Chem. Soc., Div. Polym. Chem.)* (1990) 31:59; and Y. Chujo et al., *Makromol. Chem., Macromol. Symp.* (1991) 42/43:303), using polyoxazolines. For reviews on specific applications of hybrid materials, see, e.g., M. G. Kanatzidls et al., *Chem. & Eng. News* (1990) 36; *Handbook of Conducting Polymers*, T. A. Skotheim, Ed. Marcel Dekker, New York (1986) 1 & 2; and *ACS Symposium on Conducting Polymers: Polym. Prepr.* (1994) 35-1.

Simultaneous with the development of sol-gel chemistry, and hybrid materials based on sol-gel chemistry, has been the development of conductive organic polymers, where that conductivity includes ionic and electronic conductivity. For representative reports describing electronically conductive organic polymers, see, e.g., Y. Wei et al., J. Polym Sci., Part A, Polym. Chem. (1989) 27: 2385–2396; Y. Wei et al., *J. Polym Sci, Part-C* (1990) 28:219–226; Y. Wei et al., *J. Phys. Chem.* (1990) 94:7716–7721; Y. Wei et al., *Polym Prep. Chem.* (1994) 35-1:242–243; Y. Wei et al., U.S. Pat. No. 4,940,517 (1990); Y. Wei et al., U.S. Pat. No. 4,986,886 (1991); and Y. Wei et al., U.S. Pat. No. 5,120,807 (1992).

For representative reports describing ionically conductive polymers, many of which are also used as ion exchange resins, see, e.g., Albright, R. L. and Yarnell, P. A., "Ion-Exchange Polymers" *Encyclopedia of Polymer Science and Engineering*, 2nd edition, 8:341–393 (1987); Inaba, M., et al., *Chem. Lett.* (1993) 10:1779; Rajamani, K., et al., *J. Appl. Chem. Biotechnol.* (1978) 28:699; Metwally, M. S., et al., *J. Material Sci.* (1990) 35:4993; Small, H., *Ion Chromatography*, Plenum Press, New York, (1989) pp. 41–55; Snyder, L. R., et al., *Introduction to Modern Liquid Chromatography*, 2nd edition, John Wiley & Sons, New York (1974); and Done, J. N., et al., *Applications of High-Speed Liquid Chromatography*, John Wiley & Sons, New York (1974).

Conductive polymers are being increasingly investigated for various commercial applications. For example, polyaniline has been studied as an electroactive coating that changes the corrosion behavior of stainless steel. See, e.g., DeBerry, D. W. *J Electrochem. Soc.*, (1985) 132:1027. Designs for items containing conductive organic polymer often call for the polymer to adhere to inorganic materials, e.g., metal or ceramic. Achieving intimate and stable contact between a conductive organic polymer and an inorganic material has been problematic, and there remains a need in the art for methodology to achieve this goal.

SUMMARY OF THE INVENTION

The invention provides for an inorganic organic hybrid that may be produced according to a process comprising the steps: (a) preparing a solution comprising i) solvent and ii) conductive organic polymer or a polymeric precursor thereof; (b) preparing a solution comprising i) solvent ii) monomers that can form an inorganic matrix according to sol-gel chemistry iii) a catalyst and iv) water; (c) combining the solutions of steps (a) and (b) to allow a sol-gel reaction to proceed and form a homogeneous gel; and (d) removing components having a molecular weight of less than about 300 daltons from the homogeneous gel of step (c) to provide an inorganic organic hybrid.

Another aspect of the invention is a process to prepare an inorganic organic hybrid material as described above.

DETAILED DESCRIPTION OF THE PREFERRED EMBODIMENTS

The inorganic organic hybrids of the invention, also referred to herein as hybrid materials, are the reaction product of hybrid forming components including organic polymer, sol-gel monomer, catalyst and solvent, where the solvent is preferably aqueous. The solvent provides for a homogeneous distribution of organic polymer and sol-gel monomer in a solution, and thus the resulting hybrid material will likewise have a homogeneous distribution of organic polymer in the inorganic matrix that forms from the sol-gel monomer. The catalyst is present to promote the hydrolysis and condensation chemistry that is necessary to convert the sol-gel monomer into an inorganic matrix. The sol-gel monomer reacts with itself to form an inorganic matrix, which because it typically has a high glass transition temperature, is also referred to as a glass or an inorganic glass. The organic polymer either has functionality that imbues it with conductive properties, for example electronically or ionically conductive properties, or has a structure that may react and thereby be converted to an organic polymer having conductive properties. In a preferred embodiment, the organic polymer comprises functional groups that react with the sol-gel monomer, so that covalent bonding is formed between the organic polymer and the inorganic matrix.

The inorganic matrix of the inorganic organic hybrid materials of the invention is prepared using sol-gel chemistry. Monomers that may be employed in sol-gel chemistry are numerous and well-known in the art, and are referred to herein as sol-gel monomers. Any of the monomers that are conventionally employed to prepare an inorganic matrix by way of sol-gel chemistry, may also be employed to prepare the inorganic matrix of the inorganic organic hybrid materials of the invention. Exemplary sol-gel monomers include, without limitation, tetraethyl orthosilicate (TEOS), titanium tetraisopropoxide (TIPO), aluminum tri-sec-butoxide (ASBO), silicon tetrachloride, titanium tetrabutoxide, titanium (IV) bis(ethyl acetate), silicon(IV) chloride, silicon (IV) bromide, silicon(IV) acetate, silicon(IV) acetylacetqnat=, triethoxyhydrosilane, hexachlorodisiloxane, titanium(IV) ethoxide, titanium(IV) butoxide, titanium(IV) chloride, titanium(IV) 2-ethylhexoxide, titanium(IV) oxide acetylacetonate, titanium diisopropoxide bis(2,4-pentanedionate), titanium(Iv) (triethanolaminato)isopropoxide, zirconium(IV) tert-butoxide, zirconium(IV) acetylacetonate, zirconium(IV) ethoxide, rubidium acetylacetonate, ruthenium(III) acetylacetonate, niobium(IV) ethoxide, vanadium(IV) oxytriethoxide, tungsten hexaethoxide, etc. Essentially any monomer useful in sol-gel chemistry as described in J. Livage, M. Henry and C. Sanchez, *Prog. Solid State Chem.* (1988) 18:259–341, where this article is incorporated herein by reference, may be used in the instant invention.

Sol-gel chemistry, and exemplary monomers used to prepare inorganic matrices by sol-gel chemistry, are disclosed in the following references, where each of the following references is hereby incorporated herein by reference: C. J. Brinker et al. *Sol-Gel Science, The Physics and Chemistry of Sol-Gel Processing*, Academic Press, San Diego (1990); D. R. Ulrich *J. Non-Cryst. Solids* (1990) 121:419; G. L. Wilkes et al., *Silicon-Based Polymer Science, Advances in Chemistry Series* 224, J. M. Ziegler and F. W. Fearon, Eds. Am. Chem. Soc., Washington, D.C. (1990), pp. 207–226; R. Dagani, *Chemical & Engineering News* (1991) 69–21:30; P. Calvert, *Nature* (1991) 353:501; and B. M. Novak, *Adv. Mater.* (1993) 5:422.

A general formula for sol-gel monomers is $M(R^1)_a(R^2)_b(R^3)_{(c-a-b)}$. $R^1$ may be either $R^2$ or a polymer ligand, where polymer ligand is defined herein as an organic polymer having at least one pendant $M(R^2)_b(R^3)_{(c-a-b)}$ group. Pendant groups, i.e., groups that are appended to an organic polymer, are defined as groups that are covalently bound to, but not part of, the backbone of an org niic polymer. The preferred organic polymer of the polymer ligand is a long chain of carbon atoms, having various substitutions as described below. Thus, polymer ligands are organic polymers wherein at least one hydrogen of the organic polymer is replaced with a $M(R^2)_b(R^3)_{(c-a-b)}$ group.

Sol-gel monomers incorporating a polymer ligand may be prepared by the polymerization or copolymerization reaction of monomers that are functionalized with a group of the formula $M(R^2)_b(R^3)_{(c-a-b)}$, and that undergo, for example, free radical, ionic, Ziegler-Natta, or group transfer polymerization. Exemplary monomers are methylidene monomers, i.e., monomers containing the $=CH_2$ group. Exemplary methylidene monomers include, without limitation, acrylates, methacrylates, styrene and styrene derivatives, 1-olefins and vinyl molecules.

When acrylate and/or methacrylate, i.e., $CH_2=CR^4-CO_2-R^5$, is used as a monomer to prepare the polymer ligand, at least some of said monomer may contain the $-M(R^2)_b(R^3)_{(c-a-b)}$ group, which may be covalently bound to the monomer as one or both of $R^4$ or $R^5$. Thus, $R^4$ may be $-M(R^2)_b(R^3)_{(c-a-b)}$ or $-H$ for acrylate monomers, and $-CH_3$ or $R^6-M(R^2)_b(R^3)_{(c-a-b)}$ for methacrylate monomers, where $R^6$ is a $C_1-C_{12}$ organic moiety. For either acrylate or methacrylate monomers, $R_5$ may be H, $C_1-C_{22}$ organic moiety or $R^6-M(R^2)_b(R^3)_{(c-a-b)}$.

Exemplary acrylate and methacrylate monomers that may be used to prepare the organic ligand of the invention include, without limitation, 3-(trimethoxysilyl)propyl methacrylate, 3-(triethoxysilyl)propyl methacrylate (ESMA), methacryloxypropyltris(pentamethyldisiloxanyl) silane, 3-acryloxypropyldimethylmethoxysilane, N-(3-acryloxy-2-hydroxypropyl)-3-aminopropyltriethoxysilane, 3-acryloxypropyltrimethoxysilane, 3-acryloxypropyltrichlorosilane, 2-methacryloxyethyldimethyl[3-trimethoxysilyl propyl] ammonium chloride, 3-methacryloxypropyltris (methoxyethoxy)silane, methacryloxypropenyltrimethoxysilane, 3-methacryloxypropylmethyldiethoxysilane and methacryloxypropylmethyldichlorosilane.

Styrene and styrene derivatives may also be used to prepare the organic ligand of the sol-gel monomer. Preferably, at least some styrene or styrene derivative is covalently bonded to the $M(R^2)_b(R^3)_{(c-a-b)}$ group, where the covalent bond by is achieved substituting at least one hydrogen of styrene or the styrene derivative with the $M(R^2)_b(R^3)_{(c-a-b)}$ group. The term styrene derivative is intended to include all molecules having the styrene formula, i.e., $CH_2$=CH—Ph, but wherein one or more of the styrene hydrogen atoms, other than the $CH_2$= hydrogen atoms, may be replaced with halide, sulfonic acid, or an organic moiety having 1 to about 22 carbon atoms and 0 to about 4 oxygen, sulfur, nitrogen and/or phosphorus atoms.

Exemplary, non-limiting examples of styrene derivatives include, α-methylstyrene, α-halostyrene, α-phenylstyrene, as well as styrene derivatives substituted on the phenyl ring at one or more of the o-, m- or p-positions with an alkyl, alkoxy, aryl, or halo group, such as o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-(n-butyl)styrene, p-(tert-butyl)styrene, p-(n-hexyl)styrene, p-(n-octyl)styrene, p-(n-nonyl)styrene, p-(n-decyl)styrene and p-(n-dodecyl)styrene.

Exemplary styrene and styrene derivatives that may be employed to prepare the polymer ligand of the invention include, without limitation, styrylethyltrimethoxysilane (STMS), styrylethyltriethoxysilane, styrylethyltrichlorosilane, styrylpropyltrimethoxysilane and styrylpropyldimethylethoxysilane. STMS is a preferred styrene derivative according to the invention.

The 1-olefin monomers that may be used as a monomer to prepare the organic ligand have the formula $CH_2$=$CHR^7$, wherein $R^7$ has the formula —$M(R^2)_b(R^3)_{(c-a-b)}$ or $R^3$—$M(R^2)_b(R^3)_{(c-a-b)}$, wherein $R^3$ is a hydrocarbon group having 1 to about 10 carbon atoms. Exemplary 1-olefin monomers that may be employed to prepare the polymer ligands of the invention include, without limitation, vinyltriethoxysilane, vinyltrimethoxysilane, allyltrimethoxysilane, vinyltriphenoxysilane, vinyl-tert-butoxysilane, vinyltrichlorosilane, vinyltriisopropenoxysilane, vinyltris(2-methoxyethoxy)silane, vinyltris(methylethylketoximine) silane, 1-vinyl-1-methylsila-17-crown-6,1-vinylsilatrane, vinylmethyldiethoxysilane, vinyldimethylethoxysilane, vinylmethyldichlorosilane, vinyldiethylchlorosilane, N-(3-trimethoxysilylpropyl)-N-methyl-N,N-diallylammonium chloride, tetraallyloxysilane and diisopropenoxydimethylsilane. Vinyltriethoxysilane and vinyltrimethoxysilane are preferred 1-olefin monomers according to the invention.

The polymer ligand can also be prepared by copolymerization of one or more of the methylidene monomers that contain at least one sol-gel reactive —$M(R^2)_b(R^3)_{(c-b-a)}$ group with one or more of methylidene monomers that do not contain the reactive group. Exemplary methylidene monomers that do not contain —$M(R^2)_b(R^3)_{(c-b-a)}$ group include, without limitation, acrylonitrile, vinylhalides, acrylates, methacrylates, acrylic acid, acrylamine, tetrafluoroethylene, 1,1-dihaloethylene, butadiene, 2-halobutadiene, isoprene, ethylene, a-olefins, vinylethers, vinyl acetate, vinyl carbazole, arylethylenes, vinylketones, 2-methylene-1,3-dioxepane and vinyl butyral.

$R^2$ in the sol-gel monomer or polymer ligand of the invention is a reactive leaving group, i.e., a group that may be displaced during the inorganic organic hybrid forming reaction, and allow the position formerly occupied by the $R^2$ group to be occupied by a bond to either another molecule of sol-gel monomer or a molecule of organic polymer. Representative $R^2$ groups are hydrogen, halide and $OR^9$, where $R^9$ is hydrogen or an organic moiety having from 1 to 22 carbon atoms and 0 to about 6 oxygen, sulfur, nitrogen, and/or phosphorus atoms. $C_1$–$C_5$ alkoxy groups are a preferred $R^2$ group.

$R^3$ may be an $R^2$ group, e.g., hydrogen, halide or $OR_9$, or $R_3$ may be an $R^9$ group, i.e., $R^3$ may be an organic moiety having from 1 to 22 carbon atoms and 0 to about 6 oxygen, sulfur, nitrogen, and/or phosphorus atoms. Preferably, $R^3$ is identical to $R^2$.

M in the sol-gel monomer or polymer ligand of the invention is a metal, and specifically a transition metal, a post-transition metal, a lanthanide, an actinide or silicon. That is, M has an atomic number of 13–14, 21–32, 39–51, 57–84 and 89–107. Preferred metals are Al, Si, Ti, Zr and Hf. Furthermore, M is capable of forming stable bonds to at least three atoms. Thus, "c" is at least equal to 3, and is not larger than the maximum number of atoms to which M may be bonded. For example, when M is Si, where Si ordinarily forms bonds to four atoms, then c is 4, however when M is Al, where Al ordinarily forms bonds to three atoms, then c is 3. Typically, "c" is a number including 3 to 6. The number "a" is fixed at 1. Therefore, the number "b" is at least 1 and may be as high as c–1.

The organic polymer of the inorganic organic hybrid forming components is a conductive organic polymer, where electronically or ionically conductive polymers and precursors thereof are specifically included within the term conductive organic polymer. The organic polymers have a backbone composed primarily of carbon, that may optionally incorporate other atoms, such as nitrogen and oxygen.

As the name implies, electronically conductive polymers are capable of conducting electrons upon doping. In general, electronically conductive polymers have a chain of pi orbitals that extend along the entire length of the polymer. Electronically conductive polymers are sometimes referred to in the art as electrically conductive polymers or electroactive polymers. Examples of electronically conductive polymers include polyphenylene, polyphenylvinylene, polyaniline, polythiophene polypyrrole, polyacetylene, poly (phenylene sulfide), and polydiacetylene and copolymers thereof which include at least one of said polymers in the backbone or in a side chain, as well as substituted derivatives thereof that are electrically conductive upon doping. Exemplary substitutents on an electronically conductive polymer include alkyl groups having 1 to about 22 carbon atoms, an alkoxy groups having 1 to about 22 carbon atoms. Polytoluidine, poly(o-ethoxyaniline) and poly(3-n-pentylthiophene) are exemplary substituted derivatives of electronically conductive polymers.

Exemplary electronically conductive polyanilines and derivatives thereof that may be employed in the practice of this invention are disclosed in, for example, U.S. Pat. No. 4,940,517, the entire disclosure of which is hereby incorporated herein by reference. Exemplary electronically conductive polypyrroles and derivatives thereof that may be employed in the practice of this invention are also disclosed in, for example, U.S. Pat. No. 5,120,807, the entire disclosure of which is hereby incorporated herein by reference. Exemplary electronically conductive polythiophenes and derivatives thereof that may be employed in the practice of this invention are further disclosed in, for example, U.S. Pat. No. 4,986,886, the entire disclosure of which is hereby incorporated by reference.

While the organic polymer may be an electronically conductive polymer, the organic polymer may also be a precursor to an electronically conductive polymer. Examples include (1) polymers that can be converted to electronically conductive polymers by altering the oxidation state of the precursor polymers, e.g., polyaniline in its fully reduced or fully oxidized forms, and (2) polymers that can be converted to electronically conductive polymers from soluble and processible non-conjugated precursor polymers by a simple elimination reaction, e.g., polyphenylenechloroethylene and poly(p-xylene-2-dimethylsulfonium chloride), both of which are precursors to conductive polyphenylenevinylene, where they form polyphenylenevinylene upon simple heating to achieve elimination of, e.g., HCl.

Ionically conductive polymers, as the name implies, are capable of transferring ionic groups along a polymer chain. The ionically conductive polymers of the invention have pendant charged groups, i.e., groups having a positive and/or negative charge are substituted for any hydrogen atom otherwise present on the ionically conductive polymer. Exemplary charged groups that may be incorporated into the ionically conductive polymer include, without limitation, negatively charged groups such as carboxylate, sulfate, sulfonate, phosphate, phenolate, hydroxide, alkoxylate, ketonate, enolate, borate, silicate and titanate, as well as positively charged groups such as ammonium, sulfonium, oxonium, iodonium, pyridinium, phosphenium, metallocenes and organometallic groups.

The organic polymer to which the charged groups are appended is a polymer or copolymer having a structure provided by polymerization of a monomer of the formula $CH_2=C$ $(R^a)$ $(R^b)$, wherein $R^a$ is H or $CH_3$, $R^b$ is $R^c$ or $CO_2R^3$, and $R^c$ is $C_1-C_{22}$ hydrocarbyl.

Associated with the charged group will be a counterion, where the counterion is the actual species being conducted in the ionically conductive polymers of the invention. Exemplary counterions for negatively charged groups include proton, ammonium, sulfonium, oxonium, iodonium, phosphenium, and all metal ions including, without limitation, $Na^+$, $K^+$, $Li^+$, $Mg^{++}$, $Ca^{++}$, $Fe^{++}$, $Cu^{++}$, $Zn^{++}$ and $Cr^{+++}$. Exemplary counterions for positively charged groups include, without limitation, halides, sulfate, sulfonate, phosphate, carboxylate, hydroxide, alkoxide, halorate, halorite, nitrate, nitrite and sulfite.

While the organic polymer may be an ionically conductive polymer, the organic polymer may also be a precursor to an ionically conductive polymer. A precursor to an ionically conductive polymer is any organic polymer that may undergo reaction to form an jonically conductive polymer. An example of a precursor to an ionically conductive polymer is polystyrene, where the term polystyrene is used broadly to include all polymers and copolymers that have pendant phenyl groups as may be derived from, for example, styrene. The term polystyrene as used herein thus encompasses copolymers of styrene and acrylate or methacrylate esters or acid.

The organic polymer, in addition to having functionality necessary to give the polymer conductive properties, also desirably contains functionality that allows for covalent bonding between the organic polymer and the inorganic matrix formed by the reaction of the sol-gel monomers. An exemplary functional group is $M(R^2)_b(R^3)_{(c-a-b)}$, which upon catalysis will undergo condensation reaction with the sol-gel monomers. The definitions for $R^2$, $R^3$, a, b and c in the groups pendant to the preferred polystyrenes are the same as that provided above, in regard to the inorganic component.

One convenient approach to preparing an organic polymer, having pendant $M(R^2)_b(R^3)_{(c-a-b)}$ is to copolymerize at least one of styrene or acrylonitrile with acrylate, where at least some of the acrylate has covalent bonding to the $M(R^2)_b(R^3)_{(c-a-b)}$ group. 3-(trimethoxysilyl)propyl methacrylate is an exemplary acrylate having a covalent bonding to a $M(R^2)_b(R^3)_{(c-a-b)}$ group. The copolymerization of 3-(trimethoxysilyl)propyl methacrylate with styrene provides a copolymer identified by the letter P(St-MSLA). Polymerization chemistry suited to prepare such copolymers of styrene and acrylates has been described in, e.g., Rao, V. L., et al., *J. Macromol. Sci. Chem. Ed.* (1986) A23:1079 and Rao, V. L., et al., *Eur. Polym. J.*, (1989) 25:605, where the two cited references co-authored by Rao, V.L. are incorporated herein by reference. The content of the functional groups in the organic polymer, that are reactive with sol-gel monomer, is generally small in order to afford polymer and copolymers whose properties are substantially the same as the polymers and copolymers not having sol-gel monomer-reactive groups.

Although available via free-radical chemistry, poly [methyl methacrylate-co-3-(triethoxysilyl)propyl methacrylate] [P(MMA-ESMA)] may also be prepared through group-transfer polymerization. For example, P(MMA-ESMA) may be prepared by the group-transfer copolymerization of allyl methacrylate and methyl methacrylate, using trimethylsilyl ketene acetal as the initiator and tris(dimethylamino)-sulfonium bifluoride (TASHF$_2$) as catalyst. This preparation of a methacrylate copolymer, may be followed by hydrosilylation of the ester allyl groups in the copolymer, in the presence of the Speier's catalyst (H$_2$PtCl$_6$). This method offers excellent control of the molecular weight of polymers and copolymers containing alkoxy silyl groups.

Exemplary alkoxysilyl-containing monomers that may be employed in the invention as comonomer, to provide organic polymers having functionality that is reactive with sol-gel monomers, includes, without limitation, 3-(trimethoxysilyl) propyl methacrylate (MSMA), 3-(triethoxysilyl)propyl methacrylate (ESMA) and styrylethyltrimethoxysilane (STMS) and vinyltriethoxysilane.

Polystyrene is a preferred precursor to an organic polymer that is ionically conductive. Thus, polystyrene may be combined with sol-gel monomers, catalyst and solvent to form an inorganic organic hybrid. After incorporation into a sol-gel derived matrix, polystyrene may be converted to an Ionically conductive polymer by exposure to reaction conditions that introduce the ionic functional group onto the phenyl group. Sulfonation chemistry to introduce the sulfonic acid group to the phenyl groups of polystyrene is a preferred method to convert a polystyrene to an anionically conductive sulfonated polystyrene. Suitable sulfonation methodology is described in, e.g., Braun, D., et al., Practical Macromolecular Organic Chemistry, Harwood Academic Publishers, (1984) p. 313. The aforecited Braun, D. reference is incorporated herein by reference.

Chloromethylation followed by reaction with a tertiary amine to introduce the positively charged ammonium groups to the phenyl groups of polystyrene is a preferred method to convert polystyrene to a cationically conductive polystyrene. Suitable methodology for chloromethylation followed by reaction with a tertiary amine is described in, e.g., Odian, G., *Principles of Polymerization*, 3rd edition, Wiley Interscience, (1991), p. 713, which is incorporated by reference herein.

The components necessary to form an organic inorganic hybrid of the invention includes at least one catalyst, where the catalyst may be either a proton donor, i.e., an acid, or a proton acceptor, i.e., a base, or a precursor thereof. Thus, the catalyst may be a proton source, where exemplary acids include, without limitation, HCl, HBr, HI, $H_2SO_4$, $H_3PO_{41}$ $HNO_3$, silicic acid, boric acid, methanesulfonic acid, trifluoroacetic acid, tolylsulfonic acid and polyacrylic acid. Alternatively, the catalyst may be a base, where exemplary bases include, without limitation, alkaline metal hydroxides (like NaOH, KOH, CsOH), ammonium hydroxide, ammonia, alkaline metal or ammonium alkoxides (like $NaOC_2H.$, $KOC_2H,$), alkylamine, arylamine, dialkylamine, diarylamine, trialkylamine, imidazole, poly(vinyl imidazole) and polyethylenimine.

The catalyst may also be a precursor to an acid or base. Exemplary catalysts that are a precursor to an acid are the so-called photoacids, which upon exposure to specific radiation, will decompose to form a proton. Exemplary photoacids include, without limitation, diphenyliodonium chloride (DIC) and triphenylsulfonium hexafluoroantimonate (TSHF), which decompose to form HCl upon exposure to DV radiation.

The catalyst may also be a Lewis acid or a Lewis base. Exemplary Lewis acids include, without limitation, boron trifluoride, aluminum trichloride and iron trichloride.

A preferred catalyst is HCl, where the HCl may be used directly as a hybrid forming component, or may be generated from a photoacid. When HCl is used directly as a hybrid forming component, then water is preferably present as a component solvent and hydrolysis agent.

It is important to note that under normal conditions, the presence of water is necessary for the sol-gel formation reactions. Water functions as a reagent in the first step of the sol-gel reactions, i.e., hydrolysis of the precursors. In the second step of the sol-gel reactions, i.e., polycondensation, water is partially regenerated as a condensation byproduct. When aqueous acids are used as the catalyst, or m-cresol (which often contains a small amount of water as impurity) was used as solvent in the hybrid forming sal-gel reactions, addition of an extra amount of water may not be needed because water is already present in the acids or m-cresol.

Another preferred catalyst is camphor sulfonic acid (CSA). When used as the catalyst to prepare a polyaniline-sol gel hybrid material, CSA is believed to serve three functions in the system: (1) as a dopant to dope polyaniline, (2) to render the resulting doped polyaniline soluble in common organic solvents, and (3) as an acid catalyst for the reactions of the sol-gel monomers, including P(MMA-MSMA).

The organic inorganic hybrid forms when the organic polymer and sol-gel monomers are exposed to a catalyst in the presence of a solvent. Other than being inert, a liquid under the reaction conditions, and capable of dissolving both the organic polymer and the sol-gel monomers, there is really no limitation on the identity of the solvent. The term solvent, as used herein, includes combinations of two or more component solvents. The solvent, or component solvents, which may be used in the practice of the invention include N-methylpyrrolidone, m-cresol, tetrahydrofuran, isopropanol, butylalcohol, dimethylsulfoxide, dimethylformamide, ethyl acetate, methylethylketone and acetonitrile.

Forming both the organic polymer and the sol-gel monomers as a single solution, prior to forming the inorganic organic hybrid, ensures a uniform distribution of the organic polymer in the inorganic matrix. Thus, there is no macroscopic phase separation between the organic polymers and inorganic matrix in the hybrids of the invention, as evidenced by the facts that (1) the hybrid materials are transparent and therefore the scale of phase separation, if any, should be below the wavelengths of visible light (i.e., <400 nm) and that (2) the glass transition temperature ($T_g$) of the polymer components is either unmeasurable or significantly altered in comparison with the bulk polymers.

In the preparation of polyaniline sol-gel hybrid materials, a preferred solvent is m-cresol. Casting a polyaniline sol-gel monomer film from m-cresol can provide a film having a relatively higher conductivity than may be observed if a solvent other than m-cresol is employed. According to the so-called secondary doping concept (Y. G. Min et al., *Polym. Prepr.*, (1994) 35-1:231 and Y. Xia et al., *Macromolecules* (1994) 27:7212), the higher conductivity in the presence of m-cresol can be explained as follows: m-cresol (as so-called secondary dopant) promotes the polyaniline molecular conformational change from a more "coil-like" form towards a more "rod-like" form. Since the "rod" conformation is more likely to crystallize than the "coil" conformation, the attainment of a more rod-like conformation frequently increases the crystallinity of the polymer z-nd, therefore, enhances the inter-molecular component of the bulk conductivity.

The relative amounts of the components, i.e., the relative amounts of the organic polymer, sol-gel monomers, catalyst and solvent, that may be combined to allow formation of an organic inorganic hybrid of the invention, can vary over a wide range of values. The weight ratio of the organic:inorganic component can range from less than 5:95 to more than 95:5. The choice of this ratio depends on the desired properties of the final hybrid materials. As shown in Example 1, higher organic content (i.e., more polyaniline) in a hybrid material results in better electronic conductivity. On the other hand, higher inorganic content (e.g., less polyaniline) leads to better adhesion properties to an inorganic substrate. The weight percentage of the catalyst with respect to the sol-gel precursors can range from less than 0.011 to more than 500%. Preferred range is about 0.1% to about 200%. In Example 1, the molar ratio of camphor sulfonic acid to polyaniline is 2 is to 1. The weight percentage of water with respect to the precursors can range from less than 0.1% to more than 1000%, where a preferred range is from about lo to about 100%.

The temperature range for the sol-gel reactions is only limited by the freezing point and boiling point of the reaction system that contains all the components, i.e., organic component, inorganic component, water, solvent and catalyst. A preferred reaction temperature range is from about 0° C. to about 100° C. The temperature range for post-reaction drying of the hybrid materials is from about 0° C. to more than 300° C., as long as the organic component does not decompose. A preferred range is from about 15° C. to 200° C. The post-reaction drying can also be achieved by other chemical and physical methods or the combination of these methods. Exemplary methods include, without limitation, microwave radiation, infrared radiation, and supercritical fluid extraction.

After the solutions of organic polymer and sol-gel monomer are mixed, two distinct phases may be observed, because water may be substantially the only solvent present to dissolve the sol-gel monomers, and an organic, hydrophobic solvent may be the solvent selected to dissolve the organic polymer. After the formation of the two-phase mixture, the mixture is stirred and condensation reactions will occur as the hybrid material forms. Typically, as the condensation reaction progresses and nears completion, the reaction mixture becomes homogeneous and takes on a gel-like quality, afterwhich stirring is impractical. The gel-like quality is readily discerned simply by gently shaking the reaction vessel containing the forming hybrid material: when the reaction mixture attains a gel-like quality or character, it will not readily flow upon being tilted.

As explained previously, solvent is, in most cases, necessarily present as one of the components of the organic inorganic hybrid forming reaction, in order to ensure a homogeneous distribution of organic and inorganic components in the final hybrid. However, the final hybrid material preferably contains little if any water or solvent. Steps may therefore be taken to remove the solvent, and other volatile molecules that are generated and present at the conclusion of the hybrid forming reaction, after or during formation of the hybrid material. The solvents and volatile components typically present in the reaction mixture have a molecular weight of less than about 300 daltons.

One approach to forming a solvent-free hybrid material is to cast the solution of hybrid forming components, i.e., the solution formed of organic component, inorganic component, catalyst, and aqueous solvent, onto a surface so as to form a thin film. Assuming the thickness of the film is not too large, the solvent will be readily able to evaporate away from the other hybrid forming components.

An alternative approach to preparing a solvent-free hybrid material is to place the solutions of hybrid forming components in a jar with a lid, where the lid has only a few, small orifices through which solvent may pass. The few, small orifices ensure that the solvent will escape slowly from the other hybrid forming components, and therefore that the formed hybrid material will be predominantly monolithic, i.e., a single crack-free piece of material.

Differential scanning calorimetry (DSC) analysis of the hybrid materials of the invention shows a general lack of well-defined glass transition temperatures for the polymers in the inorganic matrices, indicating that the polymer chains are uniformly distributed in the hybrid materials.

Refractive index analysis also supports the view that the organic polymers of the hybrids of the invention are uniformly distributed throughout the inorganic matrix. Polystyrene-silica hybrid materials were obtained with excellent optical transparency over the entire composition range, and wherein the refractive index changed continuously between the limits of polystyrene and silica glass. This observation is consistent with the conclusion that the polymer chains are uniformly distributed in the inorganic matrices.

It is generally the case that with increasing concentration of the conductive organic polymer in the hybrid material, the conductivity of the hybrid will increase. This view is supported, for example, by the data in Table 3, regarding the conductivity of polyaniline containing hybrid materials. The data is Table 3 is consistent with the view that the sol-gel monomers, including P(MMA-MSMA), are not electronically conductive, and that only the polyaniline component contributes to the observed conductivity. This view is also supported, for example, by the data in Table 6, which illustrates that an increase in cation exchange capacity is observed with an increase in the sulfonated polystyrene content of a hybrid material.

The invention provides for hybrid materials that serve as conductive coatings having both high conductivity and good adhesive properties. The data in Table 2, which reports the adhesion properties for polyaniline sol-gel hybrid materials, demonstrates that the adhesion of a polyaniline coating to glass increases significantly when the polyaniline is incorporated into a sol-gel matrix. By measuring both adhesion and conductivity as a function of conductive polymer content in a hybrid material, one skilled in the art may determine a hybrid composition that provides both good adhesion and good conductivity properties.

The invention will now be illustrated by the following non-limiting examples, which demonstrate the advantageous properties of the present invention. Parts and percentages are by weight unless indicated otherwise.

Reagents, Instrumentation and Measuring Techniques

Acetonitrile (Fisher, Pittsburgh, Pa.), ammonium persulfate, $(NH_4)_2S_2O_8$, (99%, EM Science, Cherry Hill, N.J.), and aluminum tri-sec-butoxide (ASBO) (Aldrich Chemical Company, Milwaukee, Wis.) were all used as received. Aniline (Aldrich) was doubly distilled under a reduced pressure prior to use. Benzene (Aldrich, HPLC grade) was purified by distillation and then stored over 4A molecular sieves. Benzoyl peroxide (Fisher) was purified by one or two recrystallizations from methyl alcohol. sec-Butyl methacrylate (SBMA) (Aldrich) was distilled under reduced pressure prior to use. Camphor sulfonic acid (Aldrich), m-cresol (Aldrich) and diphenyliodonium chloride (DIC) (Aldrich and Janssen, New Brunswick, New Jersey) were used as received. Ethyl methacrylate (EMA) (Aldrich) was distilled under reduced pressure prior to use. HCl solutions contain water as the solvent. Hexane (Fisher) and $LiClO_4$ (Johnson Matthey, West Deptford, N.J.) were used as received. Methyl methacrylate (MMA) (Aldrich) was distilled prior to use. 1-Methyl-2-pyrrolidinone (NMP) (Sigma-Aldrich, HPLC grade) was used as received. Styrene (Aldrich) was purified by treating with aqueous KOH or NaOH (to remove hydroquinone), drying over magnesium sulfate or anhydrous calcium chloride, followed by distillation under reduced pressure in a nitrogen atmosphere. Styrylethyltrimethoxysilane (STMS, United Chemical Technologies, Bristol, Pennsylvania) was purified by column chromatography on silica gel. Tetraethyl orthosilicate (TEOS) (Aldrich), tetrahydrofuran (THF) (Aldrich, HPLC grade) and titanium tetraisopropoxide (TIPO) (Aldrich) were used as received. 3-(Trimethoxysilyl)propyl methacrylate (MSMA) (Aldrich) was distilled under reduced pressure in nitrogen. Triphenylsulfonium hexafluoroantimonate (TSHF) was obtained as a 50% solution in propylene carbonate (Pflatz & Bauer, Waterbury, Conn.) and used as received.

Electrical conductivity was measured by using a standard four-probe technique. Cyclic voltammetry studies were performed on an EG&G PAR potentiostat/galvanostat (EG&G PAR, Princeton, N.J., Model 173) with a universal programmer (Model 175).

Dynamic mechanical analysis was performed on a DuPont 9900 TA thermal analysis system equipped with the DMA 983 module at a programmed heating rate of 5° C./min.

Adhesion properties were measured using Scotch tape. Thus, after coating a glass substrate with a solution of the hybrid of interest, the coating was cut with a razor to make grid lines. The total test area was 4 cm$^2$ with each square dimension of 2×2 mm. A strip of Scotch tape (Scotch™ Magic™ tape with a width of 19.0 mm, by 3M, Minneapolis, Minn.) was applied firmly to cover the grid area at room temperature. After about 1 min, the tape was stripped off with one quick peel. By counting the number of squares peeled off versus the total number of squares covered by the tape, the relative adhesivity of a film could be estimated.

EXAMPLE 1

Preparation and characterization of a hybrid material prepared from an electronically conductive organic polymer and a sol-gel monomer having a polymer ligand.

Part A: Synthesis of Polyaniline

Polyaniline in the salt form (EB-HCl salt) was prepared following the procedure of A.G. MacDiarmid et al., *Conducting Polymers*, Alcacer, L., Ed.; Reidel: Dordrecht, Holland, 1987, the entire disclosure of which is hereby incorporated herein by reference. Aniline (20.0 g, 0.214 mol) was dissolved in 600 mL of 1 M HCl and the resultant solution was cooled to below 5° C. with an ice bath. A solution (400 mL) of 12.2 g (0.053 mol) $(NH_4)_2S_2O_8$ in 1 M HCl was then added dropwise over a period of 15 min with vigorous stirring. After ~1.5 hrs, the precipitate was collected on a Buchner funnel and washed with large amounts of 1 M HCl until the filtrate became colorless. Upon drying under dynamic vacuum at room temperature for 48 hrs, the HCl doped polyaniline (EB-HCl salt) was obtained as a green powder.

A sample of the polyaniline in the HCl salt form (EB-HCl salt) was converted into the base form by stirring ~3 g of the polymer powder in an excess amount (500 mL) of 0.1 M $NH_4OH$ at room temperature for 3 hrs. Upon filtering and drying under dynamic vacuum for 48 hrs, the emeraldine base form of polyaniline (EB) was obtained as a blue powder.

Part B: Synthesis of Poly[methyl methacrylate-co-3-(trimethoxysilyl)propyl methacrylate] [P(MMA-MSMA]

The synthesis was carried out following a previously reported procedure. See Y. Wei et al., *Adv. Mater.* (1994) 6:372–374 and Y. Wei et al., *Mater. Lett.* (1992) 13:261, the entire disclosures of which are hereby incorporated herein by reference. A typical procedure for the preparation of a P(MMA-MSMA) copolymer containing 80% methyl methacrylate (MMA) and 20% 3-(trimethoxysilyl)propyl methacrylate (MSMA) units is as follows.

A 250 mL three-necked flask was charged with 12.67 g (0.05112 mol),-(trimethoxysilyl)propyl methacrylate (MSMA), 20.44 g (0.204 mol) methyl methacrylate (MMA), 2.48 g (0.0102 mol) benzoyl peroxide (BPO) and 64 mL dry benzene, and connected to a condenser, a thermometer and a nitrogen gas inlet/outlet. Nitrogen gas was bubbled into the flask throughout the reaction. With magnetic stirring, the solution was heated to 70° C. and maintained at that temperature for 3 hrs. The reaction mixture was then poured into about 800 mL hexane to precipitate the copolymer. After filtration, the copolymer was dissolved in 50 mL dry benzene, followed by reprecipitation in 800 mL hexane. This purification procedure was repeated twice. The purified copolymer was dried under vacuum at room temperature for 48 hrs to provide 20.0 g of copolymer (60% yield).

Part C: Preparation of P(MMA-MSMA) Polyaniline Hybrid

A mixture of 0.040 g polyaniline (EB) powder and 0.051 g camphor sulfonic acid (CSA) powder were ground together in a mortar to provide a fine powder having a CSA/EB molar ratio of about 2. This fine powder was then slowly added to 4.0 mL m-cresol with stirring in a fume hood to make a 1 wt % polyaniline solution. To this solution, a desired amount (see "Copolymer" in Table 1) of finely ground P(MMA-MSMA) powder was slowly added over 0.5 hours, with stirring, to yield a homogeneous solution. The homogeneous solution was then cast onto both a silica glass slide of the type used with microscopes, and onto an ITO electrode. The solvents/volatiles were allowed to evaporate in a hood for 48 hrs to give films of P(MMA-MSMA) polyaniline hybrid material, having various polyaniline contents.

In column 1 of Table 1, "PANI" stands for polyaniline, and "xx" in the term "xx%PANI" represents the weight percent of polyaniline in the P(MMA-MSMA) polyaniline hybrid films. A control experiment, identified in Table 1 as Control 1, was also done. In Control 1, polyaniline EB and CSA were dissolved in m-cresol without P(MMA-MSMA) and the resultant solution was cast onto a microslide.

TABLE 1

The Composition of P(MMA-MSMA) Polyaniline Hybrid Materials as Represented by their Precursor Solution Stoichiometry

| Code No. | CSA/EB powder (g) | Copolymer (g) |
|---|---|---|
| Control 1 (100% PANI) | 0.091 | 0.000 |
| CA1 (90% PANI) | 0.091 | 0.010 |
| CA2 (80% PANI) | 0.091 | 0.023 |
| CA3 (70% PANI) | 0.091 | 0.039 |
| CA4 (50% PANI) | 0.091 | 0.091 |
| CA5 (40% PANI) | 0.091 | 0.136 |

Part D: Film Adhesion Properties

The adhesion properties of the films as prepared in Part C were measured by the Scotch tape test, as described in the "Reagents, Instrumentation and Measuring Techniques" section, and the results are provided in Table 2.

TABLE 2

The Relationship Between the Composition of the Polyaniline P(MMA-MSMA) Hybrid Films and the Adhesivity of the Films to a Silica Glass Substrate as Measured by the Scotch Tape Test

| Code | Composition* (wt %) | Stripped Area |
|---|---|---|
| Control 1 | 100% PANI | about 90% |
| CA1 | 90% PANI | about 30% |
| CA2 | 80% PANI | about 3% |
| CA3 | 70% PANI | about 1% |
| CA4 | 50% PANI | less than 1% |
| CA5 | 40% PANI | less than 1% |

*weight percent of polyaniline in the hybrid film

Table 2 shows that the adhesion performance of polyaniline is greatly increased by incorporating polyaniline into an inorganic organic hybrid form. About 90% of the area of a pure aniline coating under the Scotch tape was peeled off. However, when a hybrid film is formed from 70 weight percent polyaniline and 30 weight percent sol-gel monomer, the Scotch tape test is unable to pull hardly any of the film away from a glass slide.

The results observed from the Scotch tape test were corroborated by an electrochemical test that simulates an electrochromic device that may be fabricated from the inorganic polyaniline hybrid materials of Part C. For these experiments, the P(MMA-MSMA) polyaniline hybrid material films were cast onto ITO electrodes from solutions containing camphor sulfonic acid and m-cresol. The composition of the films was varied to contain Ok, 10%, 20% and 30% of P(MMA-MSMA). The coated ITO electrode was used as the working electrode in 0.1 M $LiClO_4$—$CH_3CN$ electrolyte. The applied potential was cycled between −0.4 and +0.6 V vs SCE at a scan rate of 50 mV/s.

An electrochromic effect was clearly seen during the potential cycling. The film color changed from a light yellowish green at low potentials to dark blue at high potentials as the redox reactions of polyaniline proceed.

In the absence of P(MMA-MSMA), the polyaniline film (Control 1) became detached from the electrode surface after about one day of potential cycling (ca. 1800 cycles, where completion of each cycle takes 48 seconds). The residual fragments of the film that stuck on the electrode still showed electrochromism. The fragments that detached from the electrode were dark blue in color, regardless of the applied potentials. In contrast, the coatings of the P(MMA-MSMA) polyaniline hybrid materials demonstrated drastically improved adhesion to the electrode under the same potential cycling process.

For example, most of the hybrid film formed of 20% P(MMA-MSMA) and 80% polyaniline (see CA2 in Tables 1–3) adhered firmly to the ITO electrode during the potential cycling. The electrochromism was fully reversible for at least three days (5400 cycles). There was a small area of the film formed from CA2 that did not stick firmly to the ITO electrode surface and had a dark blue color. This small area of the film appeared to undergo a swelling-unswelling process as the potential was cycled. This phenomenon is not yet understood. It seems to be associated with some type of reversible gas generation/absorption. However, the film neither broke nor fell off from the electrode during the entire testing period.

The results are even more remarkable when polyaniline hybrid films having higher P(MMA-MSMA) contents were employed. For example, the hybrid film containing 30i P(MMA-MSMA) (CA3 in Tables 1–3) showed fully reversible electrochromism and full adhesion to the electrode for at least two weeks (25200 cycles).

The same experiment, i.e., CA3 hybrid material coated on ITO electrode, was repeated while exposing the hybrid material film to UV radiation. The UV source was a 15 watt UV Lamp (George W. Gates, & Co., Franklin Square, N.Y.) which emitted mainly 365 nm wavelength light. The distance between the light source and the surface of the electrolyte was 20 cm. There was no noticeable difference observed, suggesting that UV radiation did not damage the hybrid material films in our experiments.

Part E: Film Conductivity and Electrochemical Properties

A cyclic potential sweep technique was employed in this study. First, the P(MMA-MSMA) polyaniline hybrid material compositions of Table 1 were cast from m-cresol solution onto ITO electrodes, followed by drying at room temperature for 48 hrs under fume hood. A typical film on an ITO electrode had a dimension of 0.0136 mm in thickness, 8.11 mm in width and 2.80 cm in length. All the cyclic potential sweeping experiments were performed in a single-compartment three-electrode quartz cell. The working electrode was the ITO electrode coated with the P(MMA-MSMA) polyaniline hybrid material films; the counter electrode was platinum foil of 1.5 cm in length and 1.0 cm in width; and the reference electrode was a saturated calomel electrode (SCE). The potential was cycled continuously between –0.4 and +0.6 V vs. SCE at a scan rate of 50 mV/s in 100 mL electrolyte solution consisting of 0.1 M $LiClO_4$ in $CH_3CN$. The effect of the P(MMA-MSMA) content in the films, on the reversibility of electrochromic behavior of the film during the potential cycling, was investigated in the absence and in the presence of UV light. The UV source was a 15 watt UV lamp (George W. Gates & Co.) that emitted mainly 365 nm wavelength light. The distance between the light source and the surface of the electrolyte was 20 cm.

P(MMA-MSMA) polyaniline hybrid materials delivered from m-cresol were prepared having from 0 to 60% P(MMA-MSMA) and 100 to 40% polyaniline, as summarized in Table 1. As shown in Table 3, the conductivity of films formed of P(MMA-MSMA) polyaniline hybrid material decreased as the amount of P(MMA-MSMA) in the film increased. This can be explained by the fact that P(MMA-MSMA) is not electronically conductive, and only the hybrid material's polyaniline component contributes to the observed conductivity.

TABLE 3

The Relationship Between the Composition of a P(MMA-MSMA) Polyaniline Hybrid Film and Its Conductivity

| Code | Composition (wt %) | Conductivity (S/cm) |
|------|--------------------|--------------------|
| CA   | 100% PANI          | 112                |
| CA1  | 90% PANI-10% Inorganic | 17             |
| CA2  | 80% PANI-20% Inorganic | 6.1            |
| CA3  | 70% PANI-30% Inorganic | 3.4            |
| CA4  | 50% PANI-50% Inorganic | 2.5            |
| CA5  | 40% PANI-60% Inorganic | 0.3            |

As shown in Table 3, the P(MMA-MSMA) polyaniline hybrid containing 30% P(MMA-MSMA) has a reasonably high conductivity of 3.37 S/cm. As shown in Table 2, the same hybrid material has excellent adhesion to glass. Thus, a P(MMA-MSMA) polyaniline hybrid containing about 300 P(MMA-MSMA) has a good balance of properties, and is a preferred composition according to the invention.

EXAMPLE 2

Preparation and characterization of a hybrid material prepared from a polymeric precursor of an electronically conductive polymer and a sol-gel monomer not having a polymer ligand.

Part A: Synthesis of Hybrid Material

A solution was prepared by dissolving 1 g of the base form of polyaniline (EB) (prepared as described in Example 1, Part A), as a finely-ground blue powder, was dissolved in 50 mL N-methylpyrrolidone (NMP) under vigorous stirring for at least 1 hr at room temperature. The resultant blue solution was filtered through a Buchner funnel using Whatman No. 2 filter paper, to provide solution A, which contained 2 weight percent polyaniline (PANI) in NMP. 5 g of the 2 wt % polyaniline solution in NMP was then mixed with solutions containing the amounts of tetraethyl orthosilicate (TEOS) and 0.2 M HCl indicated in columns 2 and 3 of Table 4.

After stirring at room temperature for about 30 minutes, the solutions were cast onto clean silica microslides. The solvent (NMP) and other volatiles were evaporated at about 50° C., over about a 24 hr period, to afford silica polyaniline hybrid materials coated on microslides. TEOS, which is a well-known sol-gel monomer, hydrolyzes and self-condenses to form silica, which is an inorganic component of the inorganic organic hybrid materials of the invention. The composition of each hybrid was controlled by the stoichiometry of the starting solutions (i.e., the ratio of polyaniline EB to TEOS).

A free-standing film of silica polyaniline hybrid was obtained by immersing the coated microslide in water, and then lifting the film off the microslide. It is noteworthy that it was much more difficult to peel off the inorganic organic hybrid material films from the glass slides than to peel conventional polyaniline films, i.e., polyaniline not incorporated into an inorganic organic hybrid material, off the slides. The free-standing film was dried at a reduced pressure (5-mm Hg) at 60° C. for 48 hrs.

HCl-doping of the polyaniline component in the hybrid material films was achieved by immersing the coated slide, or the free-standing film, into a 1 M HCl solution for 72 hrs at room temperature, followed by drying under vacuum at 60° C. for 24 hrs.

Part B: Thermogravimetric Analysis

Thermogravimetric analysis (TGA) was used to determine the silica contents in the hybrid materials formed in Part A. TGA operates by heating a weighed sample of a hybrid material to high temperature, e.g., in excess of 700° C., to thereby decompose all the organic components of the hybrid materials. The residual weight is ascribed to the inorganic component, in this case silica. The $SiO_2$ contents of the hybrid materials as obtained from TGA generally agree with the values predicted based on the stoichiometry of the starting materials. See Table 4, which compares the predicted, or calculated $SiO_2$ content of the hybrid materials, in column 4, with the $SiO_2$ content as measured by TGA, in column 5.

The TGA measurements also reveal that the thermal stability of some organic polymeric materials (e.g., polyacrylates) is enhanced by incorporation into an inorganic organic hybrid material. This is evidenced by the observation that the thermal decomposition temperature for an organic component in a hybrid material is higher than it would be when measured from a sample of the bulk polymer.

TABLE 4

|  | TEOS (g) | 0.02 M HCl (g) | Calculated $SiO_2$ (%) | Measured $SiO_2$ (%) |
| --- | --- | --- | --- | --- |
| CG6A | 0.039 | 0.011 | 10 | 13 |
| CG6B | 0.087 | 0.025 | 20 | 25 |
| CG6C | 0.149 | 0.043 | 30 | 36 |
| CG6D | 0.231 | 0.067 | 40 | 45 |
| CG6E | 0.347 | 0.100 | 50 | 50 |
| CG6F | 0.521 | 0.150 | 60 | 62 |
| CG6G | 0.810 | 0.233 | 70 | 65 |
| CG6H | 1.388 | 0.400 | 80 | 72 |
| 4CG61 | 3.125 | 0.900 | 90 | 78 |

Part C: Conductivity Measurements

According to the procedures described in the "Reagents, Instrumentation and Measuring Techniques" section above, the conductivity of the films prepared in Part A was determined. The results are shown in Table 5, which for comparison purposes also sets forth the amount of $SiO_2$ in each of the hybrid materials as determined by TGA analysis (see Part B, above).

The data of Table 5 shows that as the amount of $SiC_2$ in an inorganic polyaniline hybrid material increases, and thus the amount of polyaniline in the hybrid decreases, there is a corresponding decrease in the conductivity of a film formed of the hybrid material. These results are consistent with the conductivity measurements performed on the hybrid material films prepared in Example 1.

TABLE 5

The Composition and Conductivity (Upon Doping with 1 M HCl) of the Polyaniline-Silica Composite Materials

| Code | $SiO_2$ Content (wt %)* | Conductivity (S/cm) |
| --- | --- | --- |
| PANI | 0 | 2.1 |
| CG6A | 13 | 0.23 |
| CG6B | 25 | 0.15 |
| CG6C | 36 | 0.1 |
| CG6D | 45 | 0.1 |
| CG6E | 50 | 0.1 |
| CG6F | 62 | 0.022 |
| CG6G | 65 | 0.003 |
| CG6H | 72 | 0.001 |
| CG6I | 78 | 0.0003 |

*Measured $SiO_2$%

EXAMPLE 3

Preparation and characterization of a hybrid material prepared from an electronically conductive organic polymer and a mixture of sol-gel monomers.

Part A: Preparation of $SiO_2/TiO_2$ Polyaniline Hybrid Materials Polyaniline was prepared as described in Example 1, Part A. The preparation of a $SiO_2/TiO_2$ polyaniline hybrid material was achieved via the sol-gel reactions of TEOS and titanium (IV) isopropoxide (TIPO) in the presence of polyaniline, following a process similar to that described in Example 2, Part A. However, since TIPO undergoes the sol-gel reactions much faster than TEOS does, some modifications of the procedures were made. Thus, the slower-reacting component (i.e., TEOS) was allowed to be partially pre-hydrolyzed prior to the addition of the faster-reacting component (i.e., TIPO), in order to compensate for the reactivity difference.

As a typical procedure, 0.104 g TEOS was mixed with 2 g NMP and 0.05 g of 0.02 M aqueous HCl. The mixture was stirred at room temperature until the solution became clear and homogeneous (denoted as Sol B). Meanwhile, 0.085 g TIPO was added to 5 g of a 2 wt % polyaniline solution in NMP (as prepared in Example 2, Part A) to afford a solution (denoted as Sol A). Sol A was then combined with Sol B to give Sol C, followed by stirring at room temperature for 10 to 30 min. Sol C was then cast onto clean silica microslides. Gelation occurred on the microslides. The solvent (NMP) ana other low molecular weight sol-gel byproducts (i.e., alcohols and water) were evaporated at about 50 OC over 24 hrs to afford a film of $SiO_2/TiO_2$ polyaniline hybrid material.

Part B: Characterization of the Hybrid Film

The total inorganic content (i.e., wt % of $SiO_2$ plus $TiO_2$) in the hybrid prepared in Part A was calculated to be 37.5 wtoi from the reactant stoichiometry. The total inorganic content as determined by TGA at 800° C. was 35 wt %, which is comparable to the calculated value. The polyaniline content in the film was therefore about 65 wt %. Upon doping with 1 M HCl, the conductivity of this $SiO_2/TiO_2$ polyaniline film was about 0.1 S/cm.

EXAMPLE 4

Preparation and characterization of a hybrid material formed from a precursor to an jonically conductive polymer having pendant groups reactive with sol gel monomer, and a sol gel monomer that does not have a polymeric ligand.

Part A: Formation of poly(St-MSMA)

A solution of 30.66 g (0.1235 mol) 3-(trimethoxysilyl) propyl methacrylate (MSMA), 30.00 g (0.2881 mol) styrene (St), 3.99 g (0.01646 mol) benzoyl peroxide (BPO) and 103 mL benzene was prepared in a 250 mL three-necked flask connected to a condenser, thermometer and a nitrogen gas inlet. Nitrogen gas was bubbled into the flask throughout the reaction. The monomer concentration in the benzene was 4.0 Molar. The BPO was used at 4 mol % based on total monomer, which was chosen in order to obtain a fairly low molecular weight copolymer.

With magnetic stirring, the solution was heated to 70° C. and maintained at that temperature for 3 hrs. Thereafter, the solution was poured into about 800 mL hexane to precipitate the copolymer. The copolymer was isolated by filtration and dissolved in about 100 mL dry benzene. The benzene solution was then added to about 800 mL hexane to reprecipitate the copolymer. Dissolution in benzene followed by addition to hexane was repeated twice. The purified copolymer was then dried under vacuum at room temperature for 24 hrs. The polystyrene copolymer was obtained in 68% yield (20.0 g). This polystyrene copolymer contains 70% styrene units.

Part B: Hybrid Formation

Five hybrids were prepared using the components shown in Table 6. Samples SG1A, SG1B and SGLC used a P(St-MSMA) having 70 mol % styrene units (i.e., the copolymer prepared in Part A). Samples SG3A and SG3B used a P(St-MSMA) having 90 mol% styrene units (prepared as described in Part A except that the rat-o of TEOS and copolymer was adjusted to yield a hybrid material with 90 mol % styrene units). In Table 6, "polystyrene" is used broadly to refer to the styrene containing polymer of Part A. The following is a description of the preparation of hybrid SG1A from Table 6.

TABLE 6

Synthesis of Silica Polystyrene Hybrid Materials

|  | SG1A | SG1B | SG1C | SG3A | SG3B |
| --- | --- | --- | --- | --- | --- |
| Polystyrene (wt %) Solution A | 55.6 | 36.9 | 20.7 | 54.3 | 38.9 |
| Polystyrene (g) | 7.28 | 7.0 | 4.0 | 3.64 | 2.1 |
| THF (g) Solution B | 29.1 | 28.0 | 16.0 | 14.56 | 8.74 |
| TEOS (g) | 8.27 | 22.60 | 32.36 | 4.14 | 6.78 |
| THF (g) | 5.76 | 15.21 | 21.77 | 2.88 | 4.57 |
| HCl (0.2 M) | 2.0 | 5.42 | 7.77 | 1.0 | 1.63 |

Solution A was prepared by dissolving 7.28 g (54.7 mmol based on repeating units) of a styrene/3-(trimethoxysilyl)propyl methacrylate copolymer (P[St-MSMA]) having 70o styrene units, in 29.12 g (0.415 mol) THF. Solution B was prepared by combining 8.27 g (39.7 mmol) TEOS, 2.00 g (0.400 mmol) 0.2 M HCl and 5.76 g (82.2 mmol) THF, and stirring for 30 minutes. Solutions A and B were combined in a 250 mL beaker and stirred to provide a clear, homogeneous solution, denoted as solution C. Solution C was allowed to stand open to the atmosphere, without stirring, to allow evaporation of the solvent (THF) and the low molecular weight products formed from the hydrolysis and condensation reactions (methanol, ethanol and water). A transparent gel resulted, which was dried in an oven at 100° C. under a nitrogen atmosphere for 2 hr.

Part C: Sulfonation of Polystyrene Component of Hybrid Material

A mixture of 2.0 g hybrid SC1A from Part B and 50 mL fuming sulfuric acid were stirred in a 100 mL flask for 4 hr at room temperature. Then the contents of the flask were poured into a 1 L beaker that contained about 250 mL of 50i sulfuric acid. After cooling, the mixture was diluted with distilled water and the resultant gold-brown colored beads were filtered using a sintered glass filter, and washed copiously with water.

Each of the 5 silica P(St-MSMA) hybrids prepared in Part B was subjected to a sulfonation reaction following the above procedure, but having varying sulfonation times as set forth in Table 7. Table 7 also shows the weight percent of polystyrene and $SiO_2$ in each sample after sulfonation, as measured by TGA, and the cation exchange capacity of the resulting hybrid (in milliequivalents per gram hybrid) as measured as described in Part D (below).

TABLE 7

Property of Sulfonated $SiO_2$, P(St-MSMA) Hybrid Materials

| Sample Code | PSt (wt %) | $SiO_2$ (wt %) | Sulfonation Time (h) | Cation Exchange Capacity (meq/g) |
| --- | --- | --- | --- | --- |
| SG1A | 55.6 | 37.9 | 4.0 | 0.86 |
| SG1B | 36.9 | 58.8 | 4.0 | 0.54 |
| SG1C | 20.7 | 76.9 | 4.0 | 0.33 |
| SG3A | 59.0 | 29.3 | 5.0 | 0.83 |
| SG3A | 59.0 | 29.3 | 24 | 1.27 |
| SG3B | 43.0 | 48.5 | 5.0 | 0.84 |
| SG3B | 43.0 | 48.5 | 24 | 1.14 |

Part D: Ion Exchange Capacity

The cation exchange capacity of each of the silicon dioxide—sulfonated polystyrene hybrid materials prepared in Part C was determined by standard procedures. See, e.g., Dorfner, K., *Ion Exchangers*, Andree Fe Coers, Ed., Ann Arbor Science Publishers, Inc. pp. 40–43, 1972. Each hybrid from Part C was treated with 1 N nitric acid to ensure full protonation of the sulfonate groups in the hybrid, i.e., to form the "H-form" of the hybrids wherein all the counterions for —$SO_3$— groups were made to be H+ by slow treatment with 1 N nitric acid. Subsequently, the hybrid beads were washed with distilled water until the wash water had a neutral pH, and then dried at 60° C. Then 1.000 g of the H-form of the sulfonated hybrid material was allowed to stand overnight in a 250 mL Erlenmeyer flask with 100 mL 0.1 N sodium hydroxide. A 25 mL aliquot of the supernatant solution in the Erlenmeyer flask was back-titrated with 0.1 N HCl using phenolphthalein as the indicator. The cation exchange capacity was calculated from the following equation: Capacity (meq/g)=[(100×Normality of NaOH)-4(mL HCl×Normality of the HCl)]/[(Sample Weight of Aliquot)(% solids of Aliquot/100)]. The cation exchange capacity for each of the sulfonated hybrids from Part C is provided in Table 7.

Part E: Thermogravimetric Analysis

Two of the hybrids described in Table 6 were characterized by thermal gravimetric analysis (TGA Analysis) using a DuPont 9900TA system equipped with a 951 TGA module, both before and after sulfonation. Hybrid SG3A had 29.3% $SiO_2$ before sulfonation, and 23.8% $SiO_2$ after sulfonation. Hybrid SG3B had 49.3% $SiO_2$ before sulfonation and 42.0% $SiO_2$ after sulfonation. These TGA results indicate that the backbones of the organic polymers have been retained after the sulfonation.

EXAMPLE 5

Preparation and characterization of a hybrid material formed from a precursor to an ionically conductive polymer having pendant groups reactive with sol gel monomer, and a sol gel monomer.

Part A: Synthesis of Poly(styrylethyltrimethoxysilane-co-methyl methacrylate) [P(STMS-MMA)]

Free radical copolymerization of styrylethyltrimethoxysilane (STMS) and methyl methacrylate (MMA) was carried out by a similar procedure for the preparation of poly(St-MSMA) (see Example 4, Part A). The monomer concentration was 2.0 M, sPO was the initiator, and it was used at a concentration of 4 mol % based on monomer.

As a typical procedure, 5.00 g (18.8 mmol) styrylethyltrimethoxysilane, 7.5 g (75 mmol) methyl methacrylate, 0.91 g (3.77 mmol) benzoyl peroxide and 47 mL dry benzene were placed in a 250-ml three-neck flask connected to a condenser, a thermometer and a nitrogen gas inlet/outlet. Nitrogen gas was bubbled into the solution throughout the reaction. With magnetic stirring, the solution was heated to 70° C. and maintained at that temperature for 6 hours. After the reaction was complete, the reaction mixture was slowly poured into about 500 mL hexane to precipitate the copolymer. The copolymer obtained was dissolved in 30 mL dry benzene and then reprecipitated in 500 mL hexane. This purification procedure was repeated twice, and the purified copolymer was dried under vacuum at room temperature for 24 hours to provide 8.4 g of the copolymer P(STMS-MMA) (67i yield). The copolymer was found to contain about 17 mol % of STMS units based on thermogravimetric analysis.

A copolymer containing 50 molo of STMS units was also prepared in a likewise manner.

Part B: Preparation of Silica P(STMS-MMA) Hybrid Materials Using HCl as Catalyst Silica P(STMS-MMA) hybrid material was prepared following the procedure for the preparation of silica poly(St-MSMA) hybrids (see Example 4, Part B). As a typical procedure, a 50 mL beaker was charged with 5.50 g (26.4 mmol) TEOS, 3.70 g (52.8 mmol) THF and 1.32 g 0.2 M HCl aqueous solution. The mixture was stirred at room temperature for 30 min to provide a homogeneous solution (denoted as Sol B). In another beaker, 0.40 g (2.18 mmol based on repeating unit) of the copolymer containing 17 mol % STMS units, as prepared in Part A, was dissolved in 1.59 g THF to form a clear solution (denoted as Sol A). Combination of Sol. A and Sol. B formed a hybrid material precursor solution (denoted as Sol C), which was stirred at room temperature for 30 min. Then Sol C was divided equally into two 50 mL beakers, which were open to ambient pressure and temperature, to allow the evaporation of solvent and other small molecule byproducts such as alcohol and water.

After the transparent gels were formed, the beakers were covered with paraffin films having several needle-punched small holes therein, to allow further evaporation of the volatile components. The covered beakers were maintained at room temperature for 10 to 40 days, followed by heating at 150° C. for 1–4 hours. Optically transparent, monolithic silica P(STMS-MMA) hybrid materials were thereby obtained as discs. It should be noted that if monolithic samples are not desired, the drying process can be greatly shortened by simply heating the gels at 100–150° C. for 2–4 hours to yield hybrid materials in powder form.

Hybrid materials with various silica contents were prepared as described above, using the reactants as summarized an Tables 8 and 9. The P(STMS-MMA) copolymer used in the reactions summarized in Table 8 contained 17 mol% STMS, while the reactions summarized in Table 9 employed 50 mol% STMS. All these P(STMS-MMA)-silica hybrid materials can be sulfonated following the same procedure as for the sulfonation of poly(St-MSMA) as provided in Example 4, Part C.

TABLE 8

Synthesis of Silica P(STMS-MMA) Hybrids.
P(STMS-MMA) Contains 17 Mol % STMS Units

|  | HG1A | HG1B | HG1C |
|---|---|---|---|
| Solution A |  |  |  |
| P(STMS-MMA) (g) | 0.40 | 0.79 | 1.19 |
| THF (g) | 1.59 | 3.16 | 4.76 |

TABLE 8-continued

Synthesis of Silica P(STMS-MMA) Hybrids.
P(STMS-MMA) Contains 17 Mol % STMS Units

|  | HG1A | HG1B | HG1C |
|---|---|---|---|
| Solution B* |  |  |  |
| TEOS (g) | 5.50 | 4.13 | 2.75 |
| THF (g) | 3.70 | 2.77 | 1.85 |
| HCl (aq. 0.2 M) (g) | 1.32 | 0.99 | 0.66 |
| $SiO_2$ wt % | 84 | 67 | 49 |

*The molar ratio of TEOS:THF:$H_2O$:HCl is 1:2:2.78:0.01.

TABLE 9

Synthesis of Silica P(STMS-MMA) Hybrids.
P(STMS-MMA) Contains 50 Mol % STMS Units

|  | HG2A | HG2B | HG2C |
|---|---|---|---|
| Solution A |  |  |  |
| P(STMS-MMA) (g) | 0.40 | 0.79 | 1.19 |
| THF (g) | 1.59 | 3.16 | 4.76 |
| Solution B* |  |  |  |
| TEOS (g) | 5.50 | 4.13 | 2.75 |
| THF (g) | 3.70 | 2.77 | 1.85 |
| HCl (aq. 0.2 M) (g) | 1.32 | 0.99 | 0.66 |
| $SiO_2$ wt % | 87 | 73 | 58 |

The molar ratio of TEOS:THF:$H_2O$:HCl is 1:2:2.78:0.01.

EXAMPLE 6

The same hybrid products as described in Example 5 can be obtained by the photoacid catalyzed sol-gel reactions of P(STMS-MMA) with TEOS.

In a typical procedure, a 50-ml beaker was charged with 5.5 g (26 mmol) TEOS, 3.7 g THF, 0.27 g (0.26 mmol) of a solution of 50% triphenylsulfonium hexafluoroantimonate (TSHF) in propylene carbonate, and 0.50 g (28 mmol) water.

The charged components were stirred at room temperature to give a two-phase mixture. The beaker was then covered with a quartz plate. While using a magnetic stirrer to stir the mixture at room temperature, the mixture was irradiated with a UV light housed in a light-proof hood. The light source employed was a 15-watts Rayonet Photochemical Reactor Lamp comprising both the short (254 nm) and long (356 nm) wavelengths at a distance of 10 cm between the lamp and the surface of the reaction mixture. After the organic-water phase separation disappeared to give a homogeneous system (denoted as Sol B), the UV radiation was stopped. In another beaker 0.40 g (2.2 mmol based on repeating unit) of the copolymer containing about 17 mold STMS units) was dissolved in 1.59 g THF to form a clear solution (denoted as Sol A). Combination of Sol A and Sol B formed a hybrid material precursor solution (denoted as Sol C), which was stirred and irradiated with UV light at room temperature until Sol C became visibly viscous.

Then Sol C was divided equally between two, 50 mL beakers, which were open to ambient pressure and temperature, to allow evaporation of solvent and small-molecule byproducts such as alcohol and water, after some evaporation, transparent gels were formed, and the beakers were covered with paraffin films having several needle-punched small holes therein, to allow further evaporation of the volatiles for 10 to 40 days, followed by heating at 150°

C. for 1–4 hours. Optically transparent, monolithic silica P(STMS-MMA) hybrid materials were thereby obtained as discs. If monolithic samples are not required, the drying process can be done by heating the gels at 100-150 OC for 2-4 hours to yield hybrids in powder form.

The following variations on the above procedure may also be conducted. Diphenyliodonium chloride (DIC) may be used in place of TSHF. Also, the hybrid materials may also be obtained by a one-step UV-irradiation of a mixture that contains all the reactants, i.e., P(STMS-MMA), TEOS, THF, TSHF, and water. It was observed that without ITV-radiation, the system did not gel after keeping in dark for more than a day.

EXAMPLE 7

Preparation and characterization of a hybrid material formed from a precursor to an tonically conductive polymer having pendant groups reactive with sol gel monomer, and a sol gel monomer.

Part A. Synthesis of Poly(styrylethyltrimethoxysilane-co-styrene) [P(STMS-St)]

Free radical copolymerization of styrylethyltrimethoxysilane (STMS) with styrene (St) was carried out in a manner analogous to that described in Example 4, Part A, except that 7.8 g (75 mmol) styrene was used instead of 7.5 g (75 mmol) methyl methacrylate. The purified yield of the copolymer P(STMS-St) was 75% and the copolymer contained about 19 mol % of STMS units.

Part B. Preparation of Silica P(STMS-St) Hybrid Materials Using HCl as Catalyst

A silica P(STMS-St) hybrid material was prepared successfully by following the same procedure for the preparation of a silica poly(St-MSMA) hybrid as set forth in Example 4, Part B, or according to the procedure for the preparation of silica P(STMS-MMA) hybrids as described Example 5.

Again, the P(STMS-St)-silica hybrids could be readily sulfonated following the same procedure for the sulfonation of poly(styrene-MSMA)-silica hybrids (see Example 4, Part C).

EXAMPLE 8

Preparation of a hybrid material formed from a precursor to an ionically conductive polymer having pendant groups reactive with sol gel monomer, and a sol gel monomer.

Following the procedures of Example 5, a P(St-PMSA) copolymer having 70 mole styrene units was prepared. Then 0.390 g (2.74 mmol based on repeating units) of the P(St-PMSA) containing 73 mol %. of styrene units and 27 mol % of MSMA units was dissolved in 1.560 g of tetrahydrofuran. (THF) to give a solution denoted as Sol A. To a solution of 0.865 g THF and 0.3 g of 0.2 M HCl (0.06 mmol), 1.259 g TEOS (6.0 mmol) was added with vigorous stirring for 30 min to yield a clear solution denoted as Sol B. Combination of Sol A and Sol B in a 50 mL beaker under vigorous stirring for 10 min resulted in a clear homogeneous solution (denoted Sol C).

Sol C was allowed to stand open to ambient air and pressure without stirring, to evaporate the solvent (i.e., THF) and the low molecular-weight products of hydrolysis and condensation (i.e., MeOH, EtOH and $H_2O$) until a clear gel formed. To obtain a crack-free hybrid material, the evaporation was then slowed down by covering the beaker with a paraffin film having a number of holes therein, made with a syringe needle. After drying for about 20 days at room temperature, a transparent, monolithic disc was obtained.

The disc was heated in an oven at 200° C. for 24 hours until its weight became essentially constant (ca. 0.7 g). Based on TGA, this $SiO_2$ polystyrene hybrid material contained 54 wt % $SiO_2$. Sulfonation of the disc can be achieved in a manner analogous to that described previously.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A process for preparing an inorganic organic hybrid material comprising:
    (a) preparing a solution comprising (i) solvent, and (ii) electronically or ionically conductive organic polymer or a polymeric precursor thereof;
    (b) preparing a solution comprising (i) solvents (ii) monomers that can form an inorganic matrix according to sol-gel chemistry, (iii) a catalyst, and (iv) water;
    (c) combining the solutions of steps (a) and (b) to allow a sol-gel reaction to proceed and form a homogeneous gel; and
    (d) removing components having a molecular weight of less than about 300 daltons from the homogeneous gel of step (c) to provide an inorganic organic hybrid comprising a conductive organic polymer and an inorganic matrix; wherein the inorganic organic hybrid is: (i) electronically conductive or (ii) ionically conductive and has an ionic conductivity level of at least about $3.15 \times 10^{-7}$ S/cm.

* * * * *